United States Patent
Chiu et al.

(10) Patent No.: US 7,944,162 B2
(45) Date of Patent: May 17, 2011

(54) MOTOR CONTROL DEVICE

(75) Inventors: Chun-Lung Chiu, Taoyuan Hsien (TW); Ming-Shi Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 414 days.

(21) Appl. No.: 12/133,874

(22) Filed: Jun. 5, 2008

(65) Prior Publication Data
US 2008/0303467 A1 Dec. 11, 2008

(30) Foreign Application Priority Data

Jun. 7, 2007 (TW) .............................. 96120524 A

(51) Int. Cl.
*H02P 23/12* (2006.01)

(52) U.S. Cl. ......... 318/400.14; 318/400.01; 318/400.13; 318/449; 318/450

(58) Field of Classification Search ............. 318/400.01, 318/400.13, 400.14, 449, 450
See application file for complete search history.

(56) References Cited

U.S. PATENT DOCUMENTS

| | | | | |
|---|---|---|---|---|
| 3,775,648 A | * | 11/1973 | Brown et al. ............ | 318/400.05 |
| 3,849,719 A | * | 11/1974 | Geiersbach et al. ......... | 363/161 |
| 4,384,242 A | * | 5/1983 | Ono .............................. | 318/721 |
| 5,432,420 A | * | 7/1995 | Bahn ............................. | 318/701 |
| 5,867,023 A | * | 2/1999 | Karagiannis et al. .... | 324/207.25 |
| 5,892,339 A | * | 4/1999 | Park et al. ................ | 318/400.38 |
| 7,218,073 B2 | * | 5/2007 | Huang et al. .................. | 318/599 |
| 7,218,846 B2 | * | 5/2007 | Wu et al. .................. | 318/400.14 |
| 7,629,758 B2 | * | 12/2009 | Hsiao et al. .................... | 318/293 |
| 2004/0155621 A1 | * | 8/2004 | Okubo ............................ | 318/772 |
| 2006/0087264 A1 | * | 4/2006 | Chiu et al. ...................... | 318/66 |

FOREIGN PATENT DOCUMENTS

TW 200705793 A 2/2007
TW 200719574 A 5/2007

* cited by examiner

*Primary Examiner* — Walter Benson
*Assistant Examiner* — Kawing Chan
(74) *Attorney, Agent, or Firm* — Muncy, Geissler, Olds & Lowe, PLLC

(57) ABSTRACT

A motor control device includes a sensing circuit, a phase-shifting circuit, a comparing circuit and a control circuit. The sensing circuit senses the motor to generate a sensing signal. The phase-shifting circuit is electrically connected to the sensing circuit and receives the sensing signal to generate a phase-shifting signal. The comparing circuit is electrically connected to the phase-shifting circuit and receives the phase-shifting signal to generate a comparing signal. The control circuit is electrically connected with the comparing circuit and the motor, and receives the comparing signal to generate a control signal so as to control the rotation speed of the motor.

12 Claims, 4 Drawing Sheets

MOTOR CONTROL DEVICE

CROSS REFERENCE TO RELATED APPLICATIONS

This Non-provisional application claims priority under 35 U.S.C. §119(a) on Patent Application No(s). 096120524, filed in Taiwan, Republic of China on Jun. 7, 2007, the entire contents of which are hereby incorporated by reference.

BACKGROUND OF THE INVENTION

1. Field of Invention

The present invention relates to a control device and in particular to a motor control device.

2. Related Art

In the field of motor controlling, a Hall sensor can be used in sensing the positions of rotating magnetic poles (magnets in the rotor) in a motor. Therefore, the rotation of the motor can be monitored by appropriately positioning the Hall sensors in the motor.

As shown in FIG. 1 and FIG. 2. A Hall sensor 11 is disposed at a position $P_1$ to sense variations in the magnetic poles (magnets in the rotor) during the rotation of the motor 12. A controller 13 is connected to the hall sensor 11 for adjusting the driving current 121 of the motor 12 according to the sensing result of the Hall sensor 11.

However, if the Hall device 11 is still disposed at the position $P_1$, it is easy to generate a surge during the driving current 121 being close to its reverse point when the rotation speed of the motor 12 increases (FIG. 2). Moreover, the phase of the driving current 121 will fall behind the phase of the driving voltage of the motor 12. Therefore, the motor 12 is likely to produce noises and operates with a worse efficiency.

To improve the above-mentioned situation, the Hall sensor 11 is disposed at a position $P_2$. As a result, the phase difference between the driving current 121 and the driving voltage can be reduced, and the surge occurring when the driving current 121 is close to its reverse point during high-speed operations of the motor 12 can be improved. Therefore, the motor 12 produces fewer noises and operates more efficiently. Nevertheless, the motor 12 has lower efficiency and larger noises during low-speed operations. Consequently, the best position of the Hall sensor 11 varies with the rotation speed of motor 12. Whether it is disposed at the appropriate position affects the control efficiency of the controller 13 over the motor 12.

SUMMARY OF THE INVENTION

In view of the foregoing, the present invention is to provide a motor control device that can eliminate the effect caused by the position of the sensor at various rotation speeds of the motor, and properly adjust the rotation speed of the motor, thereby improving the efficiency and lifetime of the motor and significantly reducing the noises.

To achieve the above, the present invention discloses a motor control device including a sensing circuit, a phase-shifting circuit, a comparing circuit and a control circuit. The sensing circuit senses the motor to generate a sensing signal. The phase-shifting circuit is electrically connected to the sensing circuit for receiving the sensing signal and generating a phase-shifting signal according to the sensing signal. The comparing circuit is electrically connected to the phase-shifting circuit for receiving the phase-shifting signal and generating a comparing signal according to the phase-shifting signal. The control circuit is electrically connected to the comparing circuit and the motor for receiving the comparing signal and generating a control signal to control the rotation speed of the motor according to the comparing signal.

As mentioned above, the motor control device of the present invention includes the phase-shifting circuit and the comparing circuit. The phase-shifting circuit makes the sensing signal phase shifted, producing the phase-shifting signal. The comparing circuit compares the phase-shifting signal to produce the comparing signal. The sensing circuit can be disposed at a fixed position adjacent to the motor and is accordingly capable of sensing the rotation speed of motor. This method not only can immediately adjust the rotations speed of the motor in an appropriate way by using the phase-shifting circuit according to the sensing signal, but also does not need to change the sensing position of the sensing circuit. Therefore, the working efficiency and lifetime of the motor can be increased, while the noises thereof are reduced.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
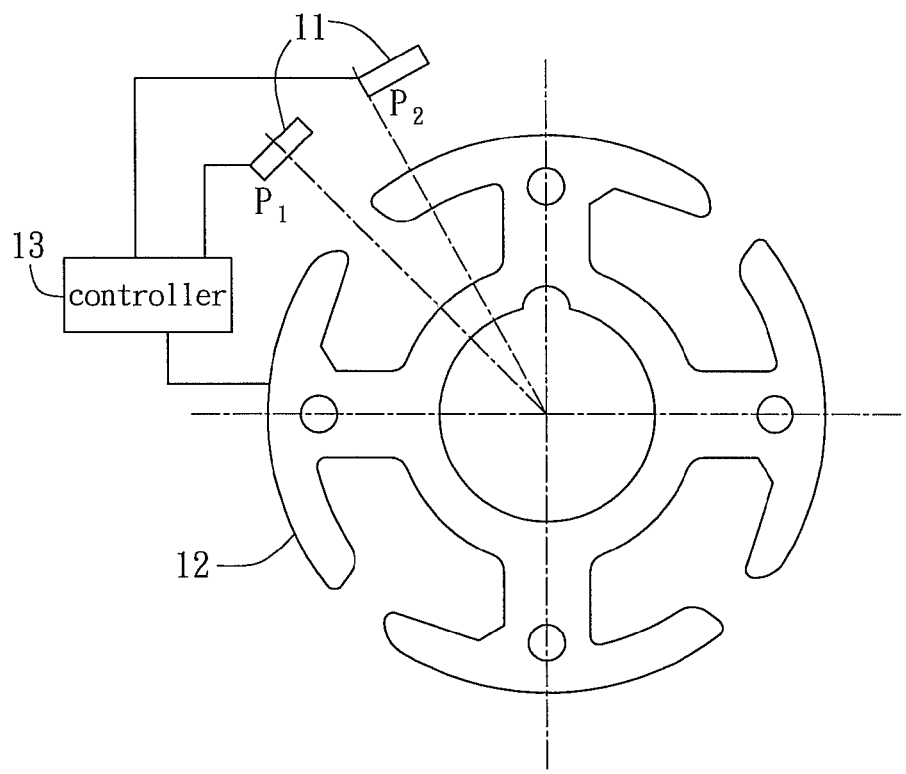
FIG. 1 is a schematic illustration of a conventional motor and a controller.
Figure 2:
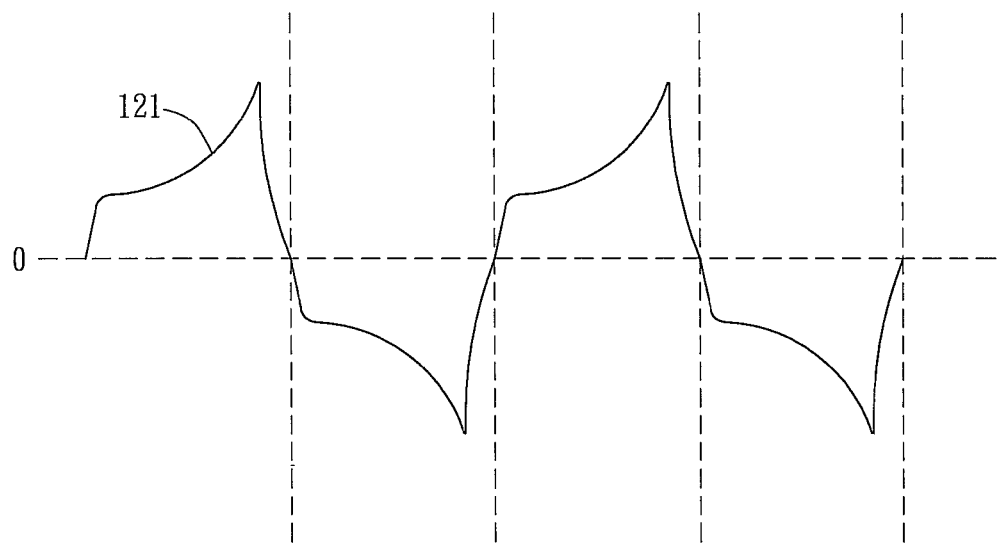
FIG. 2 shows the wave form of a motor driving current.
Figure 3:
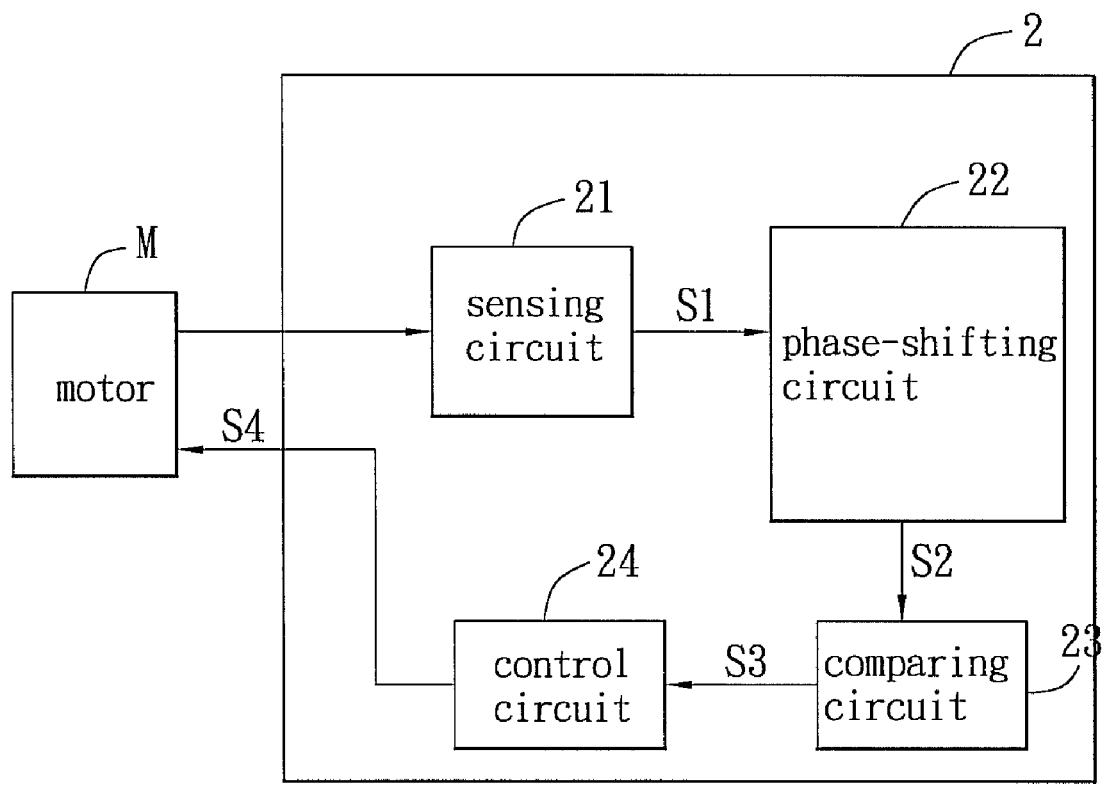
FIG. 3 is a schematic illustration of a motor control device according to a preferred embodiment of the present invention.
Figure 4:
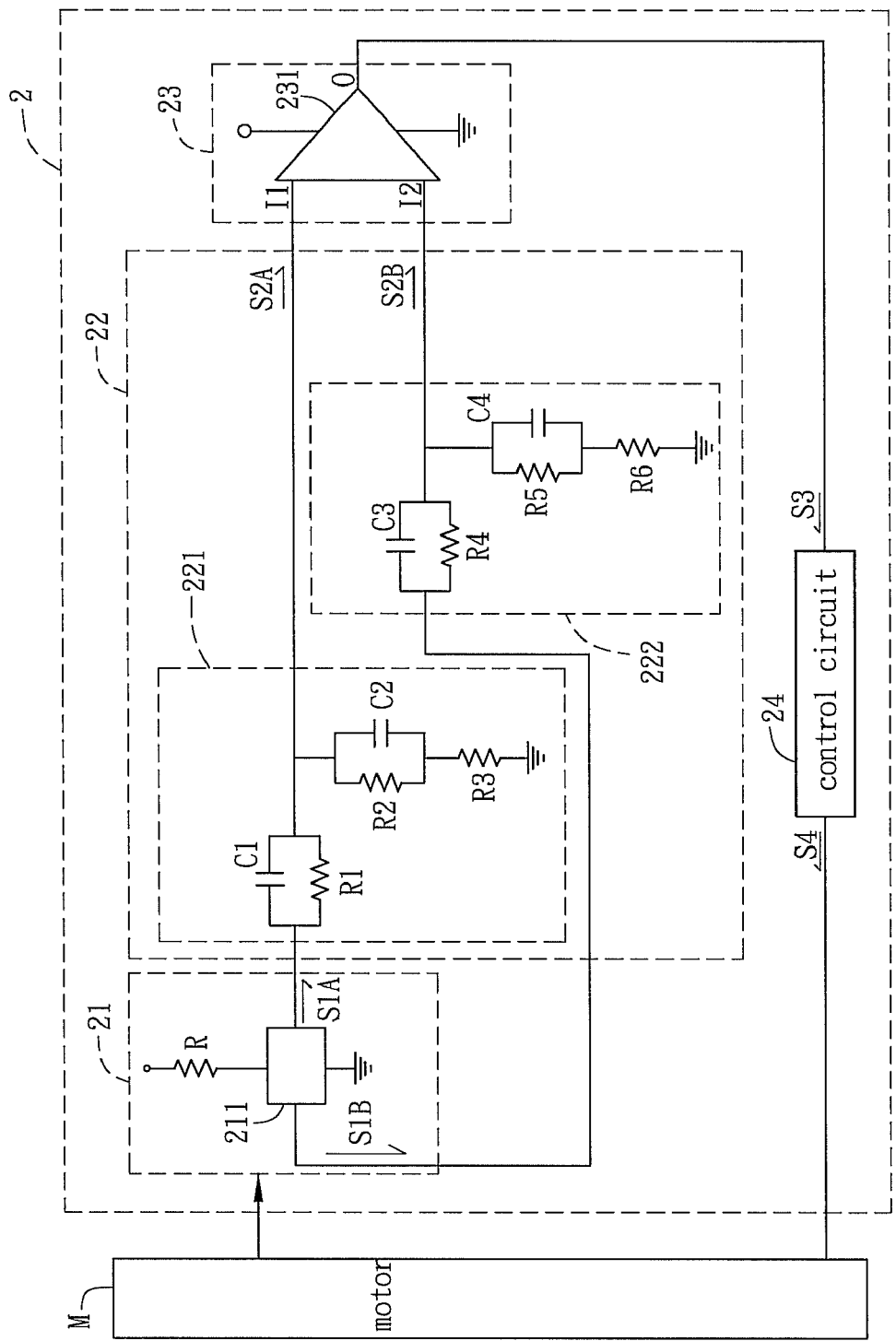
FIG. 4 shows the equivalent circuit of FIG. 3.

With reference to FIGS. 3 and 4, a motor control device 2 of a motor M according to a preferred embodiment of the present invention includes a sensing circuit 21, a phase-shifting circuit 22, a comparing circuit 23 and a control circuit 24. In the embodiment, the motor M in practice can be used or applied to various electronic devices, such as a fan.

Figure 5:
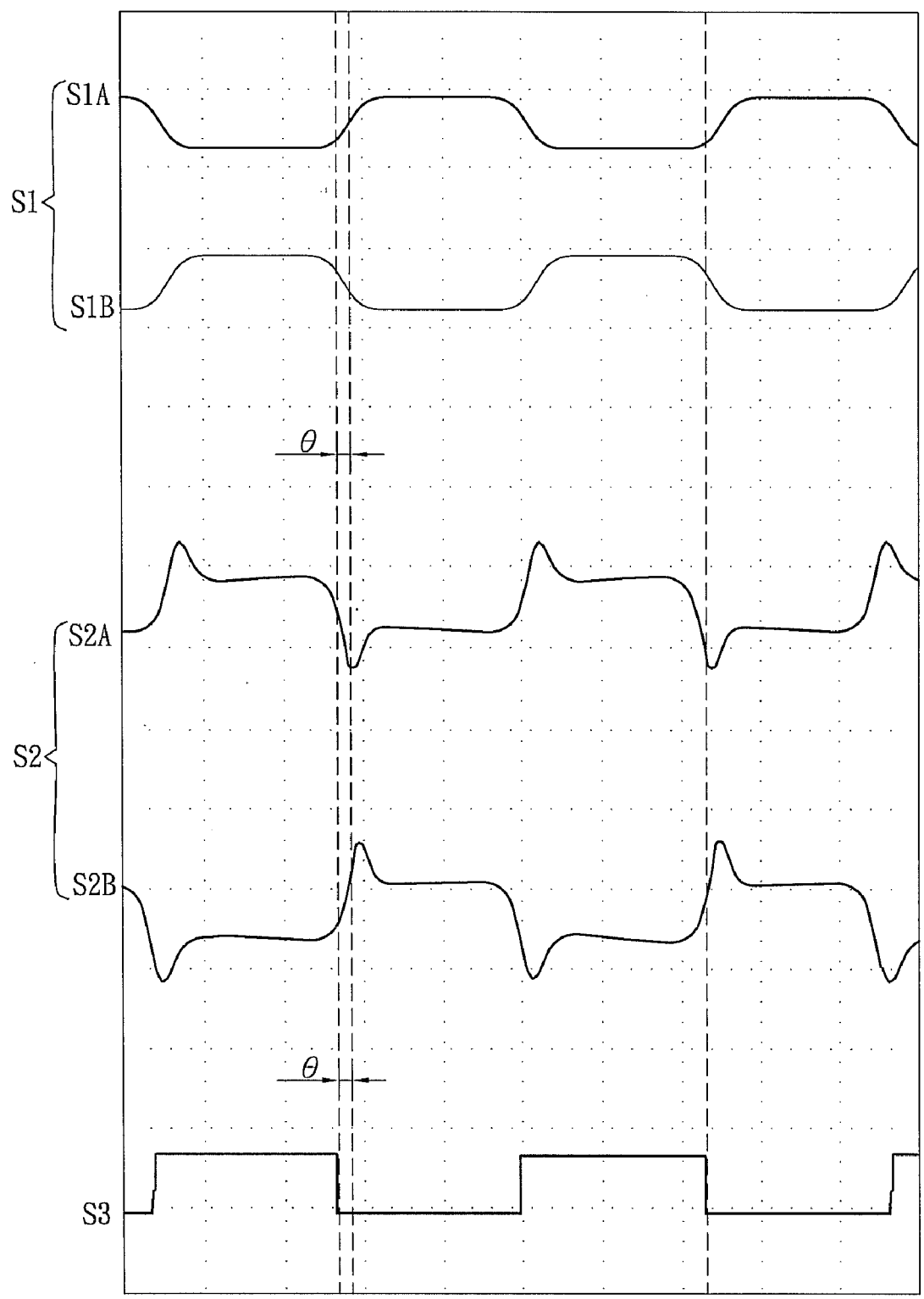
FIG. 5 shows the wave forms of the sensing signal, phase-shifting signal and comparing signal of the motor control device according to the embodiment of the present invention.

The sensing circuit 21 includes a Hall sensor 211 and a resistor R. The Hall sensor 211 is disposed at a fixed position adjacent to the motor M for sensing variations in the magnetic poles (magnets in the rotor) as the motor M rotates and then generating a sensing signal S1. Besides, the sensing signal S1 has a first sensing sub-signal S1A and a second sensing sub-signal S1B that are output respectively by two terminals of the Hall sensor 211 of the sensing circuit 21 (as shown in FIG. 4). In practice, the phase difference between the first sensing sub-signal S1A and the second sensing sub-signal S1B is 180 degrees (as shown in FIG. 5).

With reference to FIGS. 3 and 4, the phase-shifting circuit 22 is electrically connected to the sensing circuit 21. In the embodiment, the phase-shifting circuit 22 receives the sensing signal S1 and generates a phase-shifting signal S2 according to the sensing signal S2. The phase-shifting signal S2 has a first phase-shifting sub-signal S2A and a second phase-shifting sub-signal S2B. In practice, the phase difference between the first phase-shifting sub-signal S2A and the second phase-shifting sub-signal S2B is 180 degrees.

In addition, the phase-shifting circuit 22 includes a first phase-adjusting unit 221 and a second phase-adjusting unit 222 (as shown in FIG. 4). The first phase-adjusting unit 221 has a first resistor R1, a first capacitor C1, a second resistor R2, a second capacitor C2 and a third resistor R3. A first end of the first resistor R1 is electrically connected to a first end of the Hall sensor 211 of the sensing circuit 21 for receiving the first sensing sub-signal S1A of the sensing signal S1. A first end of the first capacitor C1 is electrically connected to the first end of the first resistor R1, and a second end of the first capacitor C1 is electrically connected to a second end of the first resistor R1. A first end of the second resistor R2 is electrically connected to the second end of the first resistor R1 for transmitting the first phase-shifting sub-signal S2A of the phase-shifting signal S2. The first end of the second capacitor C2 is electrically connected to a second end of the second resistor R2, and the second end of the second capacitor C2 is electrically connected to the second end of the second resistor R2. A first end of the third resistor R3 is electrically connected to the second end of the second resistor R2, and a second end of the third resistor R3 is grounded.

The second phase-adjusting unit 222 has a fourth resistor R4, a third capacitor C3, a fifth resistor R5, a fourth capacitor C4 and a sixth resistor R6. A first end of the fourth resistor R4 is electrically connected to a second end of the Hall sensor 211 of the sensing circuit 21 for receiving the second sensing sub-signal S1B of the sensing signal S1. A first end of the third capacitor C3 is electrically connected to the first end of the fourth resistor R4, and a second end of the third capacitor C3 is electrically connected to a second end of the fourth resistor R4. A first end of the fifth resistor R5 is electrically connected to the second end of the fourth resistor R4 for transmitting the second phase-shifting sub-signal S2B of the phase-shifting signal S2. The first end of the fourth capacitor C4 is electrically connected to the first end of the fifth resistor R5, and the second end of the fourth capacitor C4 is electrically connected to a second end of the fifth resistor R5. A first end of the sixth resistor R6 is electrically connected to the second end of the fifth resistor R5, and a second end of the sixth resistor R6 is grounded.

With reference to FIGS. 3 and 4, the comparing circuit 23 in this embodiment includes an operating amplifier 231 having a first input terminal I1, a second input terminal I2 and an output terminal O. The first input terminal I1 is electrically connected to the first phase-adjusting unit 221 of the phase-shifting circuit 22 for receiving the first phase-shifting sub-signal S2A. The second input terminal I2 is electrically connected to the second phase-adjusting unit 222 of the phase-shifting circuit 22 for receiving the second phase-shifting sub-signal S2B. The operating amplifier 231 of the comparing circuit 23 compares the first phase-shifting sub-signal S2A with the second phase-shifting sub-signal S2B, and outputs a comparing signal S3 via the output terminal O of the operating amplifier 231.

The comparing signal S3 in practice is a square wave (as shown in FIG. 5) having a high level and a low level. When the first phase-shifting sub-signal S2A is greater than the second phase-shifting sub-signal S2B, the comparing signal S3 is at the high level. Otherwise, when the first phase-shifting sub-signal S2A is smaller than the second phase-shifting sub-signal S2B, the comparing signal S3 is at the low level.

Please refer to FIG. 5. The sensing signal S1 and the phase-shifting signal S2 differ by a phase θ. The comparing signal S3 is generated according to the comparison result of the first phase-shifting sub-signal S2A and the second phase-shifting signal S2B of the phase-shifting signal S2. Therefore, when the sensing signal S1 and the phase-shifting signal S2 differ by a phase θ, the sensing signal S1 and the comparing signal S3 also differ by the phase θ.

In this embodiment, the control circuit 24 can be a programmable chip, an integrated circuit, a processor, a digital signal processor, a microprocessor or a microprocessing chip. It receives the comparing signal S3 and generates a control signal S4 according to the comparing signal S3 so as to adjust the rotation speed of the motor M.

The motor control device 2 of the embodiment is featured in that the phase-shifting circuit 22 and the comparing circuit 23 are disposed between the sensing circuit 21 and the control circuit 24. The phase-shifting circuit 22 generates the phase-shifting signal S2 according to the sensing signal S1. The comparing circuit 23 generates the comparing signal S3 according to the phase-shifting signal S2. The control circuit 24 generates the control signal S4 according to the comparing signal S3 to control the rotation speed of the motor M. In the present invention, the position of the Hall sensor 211 in the sensing circuit 21 does not need to be changed, and the rotation speed of motor M can be immediately changed by adjusting the phase of the sensing signal S1 by using the phase-adjusting circuit. Therefore, the working efficiency and lifetime of the motor M are increased, and the noises during the operation of motor are reduced.

In summary, the motor control device of the present invention adds the phase-shifting circuit and the comparing circuit. The phase-shifting circuit makes the sensing signal phase shifted, producing the phase-shifting signal. The comparing circuit compares the phase-shifting signal to produce the comparing signal. The sensing circuit can be disposed at a fixed position adjacent to the motor and is accordingly capable of sensing the rotation speed of motor. This method not only can immediately adjust the rotations speed of motor in an appropriate way by using the phase-shifting circuit according to the sensing signal, but also does not need to change the sensing position of the sensing circuit. Therefore, the working efficiency and lifetime of the motor can be increased, while the noises thereof are reduced.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control device, comprising:
    a sensing circuit for sensing a motor to generate a sensing signal, wherein the sensing signal comprises a first sensing sub-signal and a second sensing sub-signal;
    a phase-shifting circuit electrically connected to the sensing circuit for receiving the sensing signal and generating a phase-shifting signal according to the sensing signal;
    a comparing circuit electrically connected to the phase-shifting circuit for receiving the phase-shifting signal and generating a comparing signal according to the phase-shifting signal; and
    a control circuit, electrically connected to the comparing circuit and the motor, for receiving the comparing signal and generating a control signal to control the rotation speed of the motor according to the comparing signal,
    wherein the phase-shifting circuit comprises a first phase-adjusting unit electrically connected to the sensing circuit for receiving the first sensing sub-signal and generating a first phase-shifting sub-signal according to the first sensing sub-signal, and the first phase-adjusting unit comprises:
a first resistor having a first end electrically connected to the sensing circuit for receiving the first sensing sub-signal;
a first capacitor having a first end electrically connected to the first end of the first resistor and a second end electrically connected to a second end of the first resistor;
a second resistor having a first end electrically connected to the second end of the first resistor for transmitting the first phase-shifting sub-signal;
a second capacitor having a first end connected to the first end of the second resistor and a second end electrically connected to a second end of the second resistor; and
a third resistor having a first end electrically connected to the second end of the second resistor and a second end grounded.

2. The motor control device of claim 1, wherein the sensing circuit comprises a Hall sensor.

3. The motor control device of claim 1, wherein the phase of the first sensing sub-signal and the phase of the second sensing sub-signal differ by 180 degrees.

4. The motor control device of claim 1, wherein the phase-shifting circuit comprises:
a second phase-adjusting unit electrically connected to the sensing circuit for receiving the second sensing sub-signal and generating a second phase-shifting sub-signal according to the second sensing sub-signal.

5. The motor control device of claim 4, wherein the second phase-adjusting unit comprises:
a fourth resistor having a first end electrically connected to the sensing circuit for receiving the sensing signal;
a third capacitor having a first end electrically connected to the first end of the fourth resistor and a second end electrically connected to a second end of the fourth resistor;
a fifth resistor having a first end electrically connected to the second end of the fourth resistor for transmitting the second phase-shifting sub-signal;
a fourth capacitor having a first end connected to the first end of the fifth resistor and a second end electrically connected to a second end of the fifth resistor; and
a sixth resistor having a first end electrically connected to the second end of the fifth resistor and a second end grounded.

6. The motor control device of claim 4, wherein the phase-shifting signal comprises the first phase-shifting sub-signal and the second phase-shifting sub-signal.

7. The motor control device of claim 6, wherein the phase of the first phase-shifting sub-signal and the phase of the second phase-shifting sub-signal differ by 180 degrees.

8. The motor control device of claim 4, wherein the comparing circuit comprises an operating amplifier having a first input terminal, a second input terminal and an output terminal, the first input terminal and the second input terminal are electrically connected to the first phase-adjusting unit and the second phase-adjusting unit to receive the first phase-shifting sub-signal and the second phase-shifting sub-signal respectively, and the output terminal transmits the comparing signal.

9. The motor control device of claim 1, wherein the comparing signal is a square wave.

10. The motor control device of claim 1, wherein the phase difference between the sensing signal and the phase-shifting signal is equal to the phase difference between the sensing signal and the comparing signal.

11. The motor control device of claim 1, wherein the phase of sensing signal and the phase of the phase-shifting signal are different.

12. The motor control device of claim 1, wherein the control circuit is a programmable chip, an integrated circuit, a processor, a digital signal processor, a microprocessor or a microprocessing chip.

* * * * *